US008755647B2

(12) United States Patent
Yaacobi et al.

(10) Patent No.: US 8,755,647 B2
(45) Date of Patent: Jun. 17, 2014

(54) METHODS AND APPARATUS FOR VERTICAL COUPLING FROM DIELECTRIC WAVEGUIDES

(71) Applicants: Ami Yaacobi, Cambridge, MA (US); Brad Gilbert Cordova, Cambridge, MA (US); Jie Sun, Cambridge, MA (US); Michael Watts, Hingham, MA (US)

(72) Inventors: Ami Yaacobi, Cambridge, MA (US); Brad Gilbert Cordova, Cambridge, MA (US); Jie Sun, Cambridge, MA (US); Michael Watts, Hingham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/798,499

(22) Filed: Mar. 13, 2013

(65) Prior Publication Data

US 2013/0272652 A1     Oct. 17, 2013

Related U.S. Application Data

(60) Provisional application No. 61/617,703, filed on Mar. 30, 2012.

(51) Int. Cl.
*G02B 6/26* (2006.01)
*G02B 6/42* (2006.01)

(52) U.S. Cl.
CPC . *G02B 6/264* (2013.01); *G02B 6/26* (2013.01)
USPC .................... 385/27; 385/31; 385/33; 385/39

(58) Field of Classification Search
USPC .......................................... 385/27, 31, 33, 39
See application file for complete search history.

(56) References Cited

U.S. PATENT DOCUMENTS

| | | | |
|---|---|---|---|
| 6,684,007 B2 | 1/2004 | Yoshimura et al. | |
| 7,426,322 B2 | 9/2008 | Hyde | |
| 7,496,127 B2 | 2/2009 | Matsuda et al. | |
| 7,619,816 B2 | 11/2009 | Deng et al. | |
| 7,627,018 B1 * | 12/2009 | Guilfoyle et al. | ............. 372/102 |
| 7,679,748 B2 | 3/2010 | Chen et al. | |

(Continued)

FOREIGN PATENT DOCUMENTS

| | | |
|---|---|---|
| WO | WO-2011/050272 A2 | 4/2011 |
| WO | WO2012/149441 | 11/2012 |

OTHER PUBLICATIONS

International Search Report and Written Opinion on PCT/US2013/030987, Jun. 27, 2013, pp. 1-10.

(Continued)

*Primary Examiner* — Charlie Peng
*Assistant Examiner* — Mary El Shammaa

(57) ABSTRACT

A frequency-chirped nano-antenna provides efficient subwavelength vertical emission from a dielectric waveguide. In one example, this nano-antenna includes a set of plasmonic dipoles on the opposite side of a $SiYV_4$ waveguide from a ground plane. The resulting structure, which is less than half a wavelength long, emits a broadband beam (e.g., >300 nm) that can be coupled into an optical fiber. In some embodiments, a diffractive optical element with unevenly shaped regions of high- and low-index dielectric material collimates the broadband beam for higher coupling efficiency. In some cases, a negative lens element between the nano-antenna and the diffractive optical element accelerates the emitted beam's divergence (and improves coupling efficiency), allowing for more compact packaging. Like the diffractive optical element, the negative lens element includes unevenly shaped regions of high- and low-index dielectric material that can be designed to compensate for aberrations in the beam emitted by the nano-antenna.

23 Claims, 10 Drawing Sheets

(56) References Cited

U.S. PATENT DOCUMENTS

| | | | |
|---|---|---|---|
| 8,064,745 B2 * | 11/2011 | Fortusini et al. | 385/37 |
| 2005/0094939 A1 | 5/2005 | Ghiron et al. | |
| 2007/0075265 A1 | 4/2007 | Gorrell et al. | |
| 2011/0142395 A1 * | 6/2011 | Fortusini et al. | 385/37 |
| 2011/0267611 A1 | 11/2011 | Li et al. | |
| 2012/0281950 A1 | 11/2012 | Fattal et al. | |

OTHER PUBLICATIONS

Seo, M. et al., "Active Terahertz Nanoantennas Based on VO2 Phase Transition," Nano Letters, vol. 10, No. 6, pp. 2064-2068 (May 14, 2010).

* cited by examiner

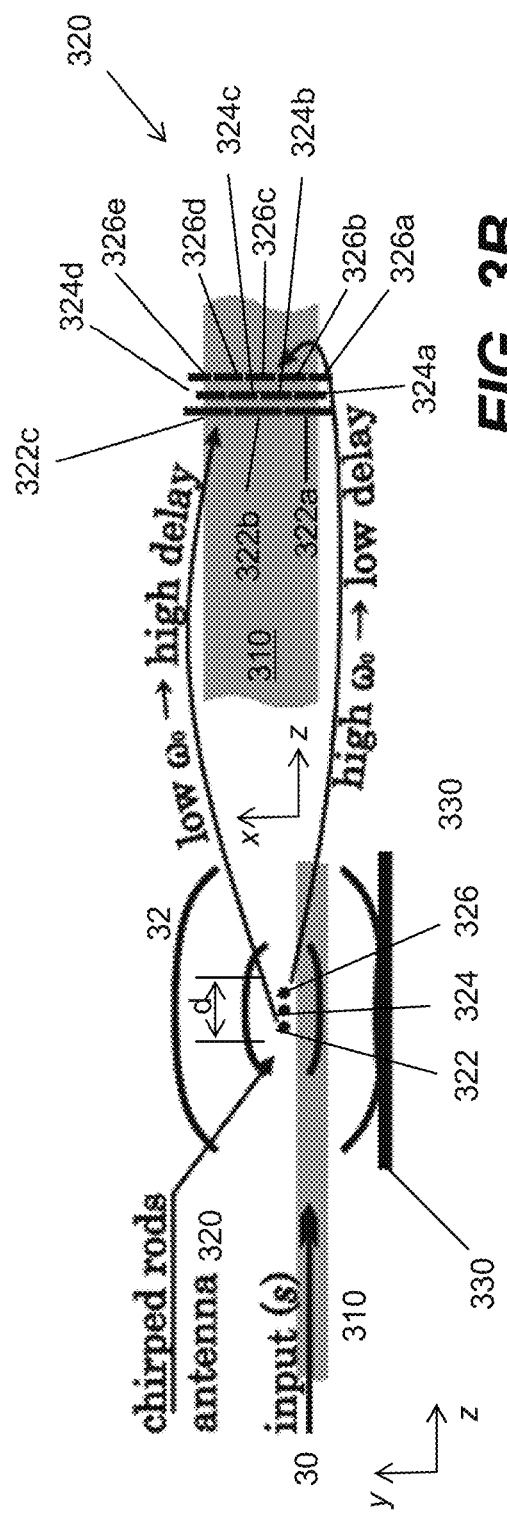

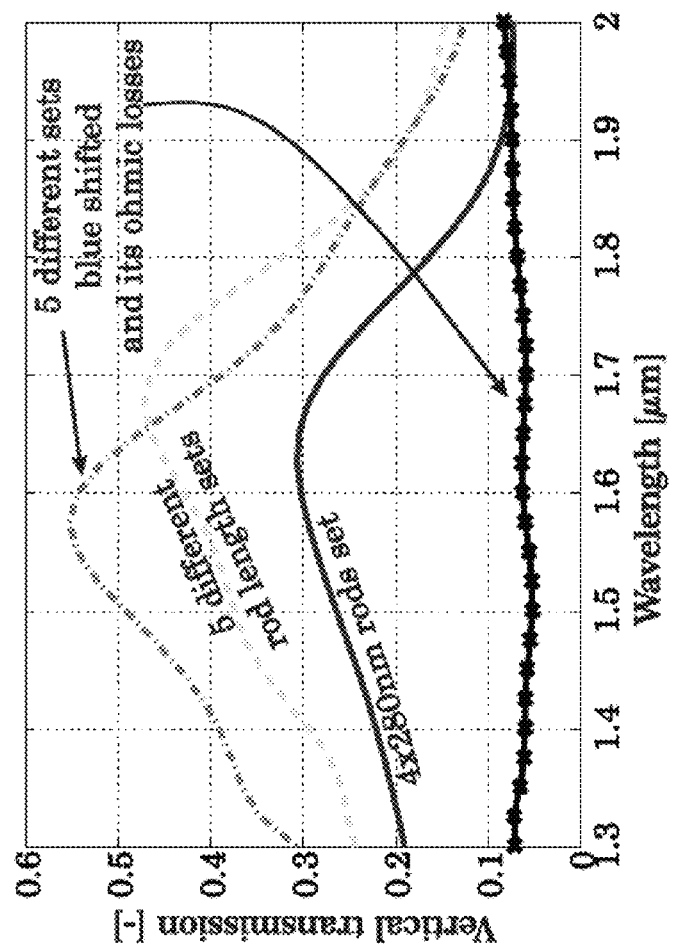
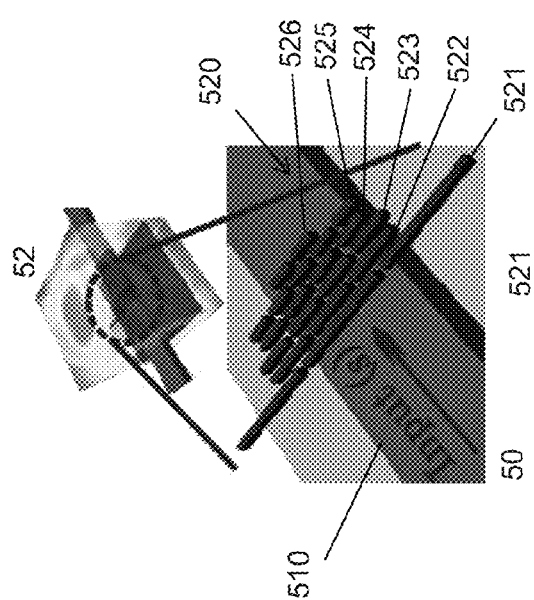
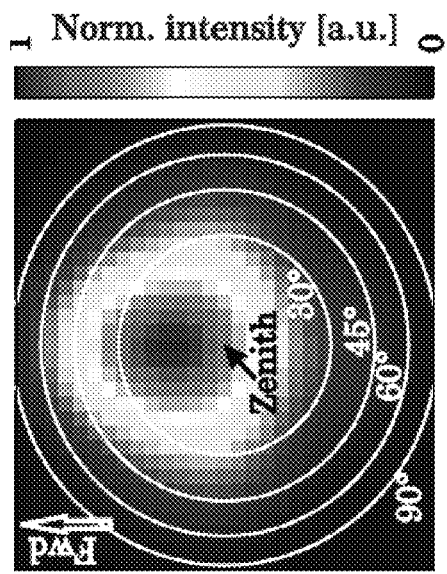
FIG. 5A
FIG. 5B
FIG. 5C

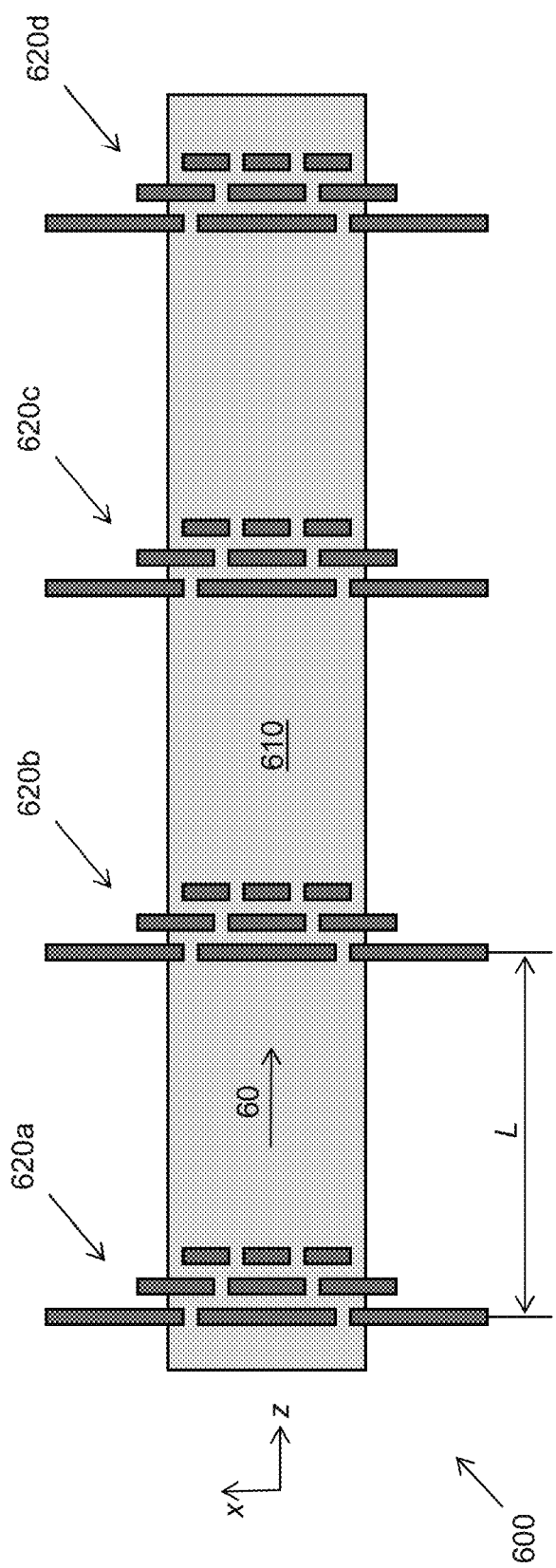

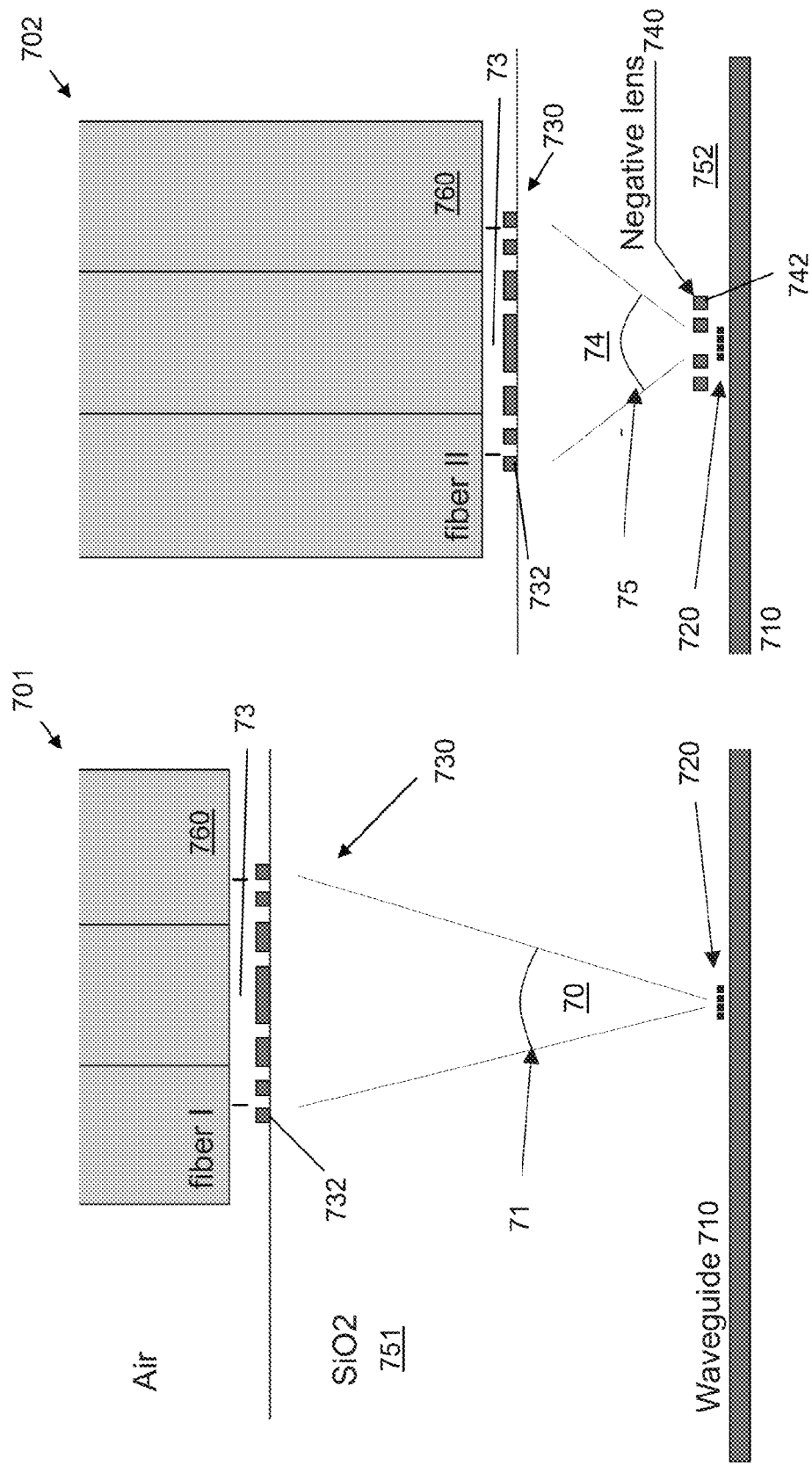

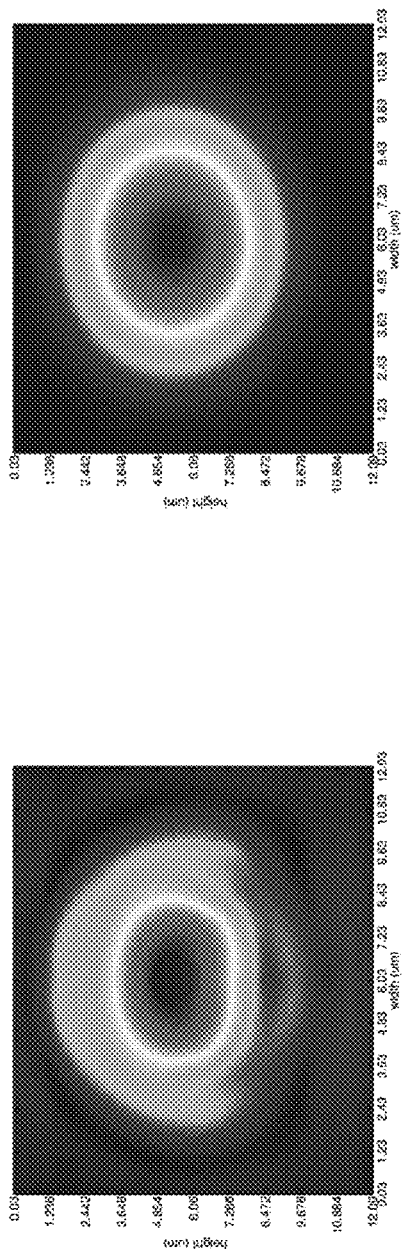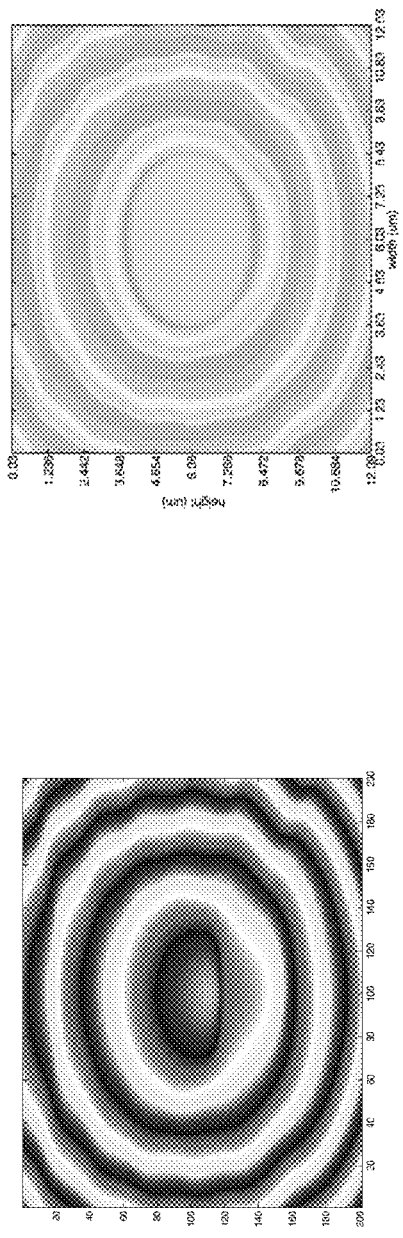
FIG. 8B
FIG. 8D
FIG. 8A
FIG. 8C

US 8,755,647 B2

METHODS AND APPARATUS FOR VERTICAL COUPLING FROM DIELECTRIC WAVEGUIDES

GOVERNMENT SUPPORT

This invention was made with government support under Grant No. DE-AC04-94AL85000 awarded by the Department of Energy. The government has certain rights in this invention.

CROSS-REFERENCE TO RELATED PATENT APPLICATION

This application claims the benefit, under 35 U.S.C. §119(e), of U.S. Provisional Patent Application No. 61/617,703, filed on Mar. 30, 2012, entitled "Two Wave Coupling Using Phase Chirped Resonators," which application is hereby incorporated herein by reference.

BACKGROUND

Vertical couplers can be used to couple light from planar waveguides to optical fibers. Many vertical fiber-chip coupler designs have been proposed and demonstrated in the last decade. These couplers are based on grid coupling directly between the fiber and the on-chip waveguide. Therefore, this grid must be about as big as the fiber mode (e.g., about 10-30 μm) to support a similar field distribution and to maximize the coupling efficiency. This size constraint limits the coupler bandwidth to a full-width half-maximum (FWHM) of about 60 nm, which is on the same order as the fabrication errors for the center wavelength. It also limits the vertical couplers' usefulness for other applications, including optical phased array (OPAs).

Short antennas have been used to vertically couple radiation at radio frequency (RF) wavelengths. But these RF antennas do not operate on dielectric waveguides. Rather, RF antennas are fed from thin transmission lines, enabling the excitation of the antenna to occur at a single point or multiple points. Unfortunately, the dielectric waveguides used at optical wavelengths cannot be separated from the guided wave, so the guided wave interacts with the entire antenna instead of exciting a single point.

SUMMARY

Embodiments of the present invention include an apparatus for coupling light into and/or out of a waveguide. An exemplary apparatus includes a waveguide that has an effective refractive index of $n_{eff}$ and, in operation, guides an electromagnetic wave having a wavelength $\lambda$ in a first direction. The apparatus also includes a first coupling structure that is electromagnetically coupled to the waveguide and includes first and second radiative resonators. In operation, the first radiative resonator couples a first portion of the electromagnetic wave out of (and/or into) the waveguide. The second radiative resonator, which disposed in the first direction within $\lambda/(2n_{eff})$ of the first radiative resonator, couples a second portion of the electromagnetic wave out of (and/or into) the waveguide so as to produce constructive interference between the first and second portions of the electromagnetic wave.

The waveguide may include silicon, silicon dioxide, silicon nitride, silicon oxinitride, metal, and/or Teflon depending on its operating wavelength, which may be from about 400 nm to about 1600 nm, from about 3 μm to about 14 μm, or from about 50 μm to about 50 cm. The first and second radiative resonators may each comprise a conductive material, such as a metal.

In some examples, the first radiative resonator resonates at a first frequency and the second radiative resonator resonates at a second frequency higher than the first frequency. This may be achieved by designing the first radiative resonator and/or the second radiative resonator to include a dipole antenna. These first and second resonance frequencies may be chosen so as to produce the constructive interference in a second direction at an angle of about 80° to about 100° with respect to the first direction when the first and second radiative resonators excited by the electromagnetic wave.

Embodiments of this apparatus may also include one or more additional (second) coupling structures. These additional structures are in electromagnetic communication with the waveguide and disposed in the first direction at a distance of at least about $\lambda/n_{eff}$ from the first coupling structure. For example, these second coupling structures may be disposed at periodic intervals along the waveguide in the first direction. In operation, they couple additional portions of the electromagnetic wave out of and/or into the waveguide.

Embodiments of the present invention also include an apparatus that collimates light. In some examples, this apparatus includes a waveguide, a vertical coupler in optical communication with the waveguide, and a (first) diffractive optical element in optical communication with the vertical coupler. In operation, the waveguide guides a first optical wave having a wavelength $\lambda$ in a first direction. The vertical coupler, which has a length in the first direction of about 10 nm to about 10 μm, couples at least a portion of the first optical wave out of the waveguide so as to produce a second optical wave propagating in a second direction at an angle of about 80° to about 100° with respect to the first direction. The diffractive optical element, which includes at least one irregularly shaped region of first dielectric material, collimates at least a portion of the second optical wave so as to produce a collimated wave, which can optionally be coupled into an optical fiber. (As readily understood by those of ordinary skill in the art, this structure can also be used to couple light from such an optical fiber or other source into the waveguide.)

In some cases, the vertical coupler comprises a dielectric grating or a nano-antenna. The vertical coupler may have a bandwidth of about 60 nm to about 500 nm.

Examples of this collimating apparatus may further include a layer of a second dielectric material disposed between the vertical coupler and the diffractive optical element. In such examples, the irregularly shaped region of first dielectric material comprises a plurality of irregular rings, and the diffractive optical element further comprises second dielectric material deposited between at least two irregular rings in the plurality of irregular rings. The first dielectric material may include silicon nitride, silicon oxinitride, or silicon dioxide, and the second dielectric material may include silicon dioxide.

Exemplary collimating apparatus may also include another (second) diffractive optical element, disposed between the vertical coupler and the first diffractive optical element, to cause the second optical wave to diverge. In these examples, the waveguide may include a cladding with a refractive index $n_{cladding}$, and the second diffractive optical element may be disposed about 50 nm to about $\lambda/n_{cladding}$ from the vertical coupler. In addition, the apparatus may include an optical fiber to receive at least a portion of the collimated wave. If so, then the first diffractive optical element may be configured to cause a wavefront of the collimated wave to substantially match a phase distribution associated with a mode of the optical fiber. The second diffractive optical element may be configured to cause a spatial amplitude distribution of the collimated wave to substantially match an amplitude distribution associated with the mode of the optical fiber.

Another embodiment of the present invention is a photonic device that includes a waveguide, a coupling structure electromagnetically coupled to the waveguide, a negative lens element in optical communication with the coupling structure, a collimating lens element in optical communication with the negative lens element, a first cladding layer disposed between the coupling structure and the negative lens element, and a second cladding layer disposed between the negative lens element and the collimating lens element. In operation, the waveguide, which has an effective refractive index of $n_{eff}$, guides a first optical beam with a wavelength and, optionally, a bandwidth of about 100 nm to about 500 nm. The coupling structure couples at least a portion of the first optical beam out of the waveguide so as to form a second optical beam. The negative lens element causes at least a portion of the second optical beam to diverge so as to form a diverging optical beam. And the collimating lens element, which includes at least one irregularly shaped region of first dielectric material, collimates at least a portion of the second optical beam so as to produce a collimated beam, which may be coupled into an optical fiber.

The coupling structure may include two or more (radiative) resonators: a first resonator that resonates at a first frequency within a bandwidth of the first optical beam and a second resonator, disposed within $(\lambda/2n_{eff})$ of the first resonator, that resonates at a second frequency within the bandwidth of the first optical beam. For example, the first resonator may comprise a first dipole antenna and the second resonator may comprise a second dipole antenna. The first and second frequencies are chosen so as to produce constructive interference in a direction substantially perpendicular to a longitudinal axis of the waveguide.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 3A and 3B shows side and top views, respectively, of a vertical coupling structure, spanning a length less than $\lambda/2n_{eff}$, that couples radiation out of a dielectric waveguide with a refractive index of $n_{eff}$.

FIG. 5A shows a vertical coupling structure with blue-shifted, chirped nano-rods electromagnetically coupled to a dielectric waveguide.

FIG. 5B is a plot of the free-space, far-field pattern emitted by the vertical coupling structure in FIG. 5A at a wavelength of $\lambda=1550$ nm.

FIG. 5C is a plot of the simulated vertical emission for the blue-shifted, chirped nano-rod structure of FIG. 5A; for an unshifted, chirped nano-rod structure; and for an unchirped nano-rod structure.

FIG. 6 shows a top view of an array of periodically spaced sets of chirped resonators, each of which is less than $\lambda/2n_{eff}$ long, that couple radiation out of a dielectric waveguide.

FIG. 7A shows a diffractive optical element that collimates light emitted from a vertical coupler into an optical fiber.

FIG. 7B shows a negative diffractive optical element that expands a beam emitted from a vertical coupler and a positive diffractive optical element that couples the expanded beam into an optical fiber.

FIG. 8A is a plot of the mode emitted by a short grating vertical coupler.

FIG. 8B is a plot of an optical fiber mode.

FIGS. 8C and 8D are plots of the phase profile of the wave emitted by a short grating vertical coupler before and after collimation, respectively, with a diffractive optical element.

DETAILED DESCRIPTION

Figure 2:
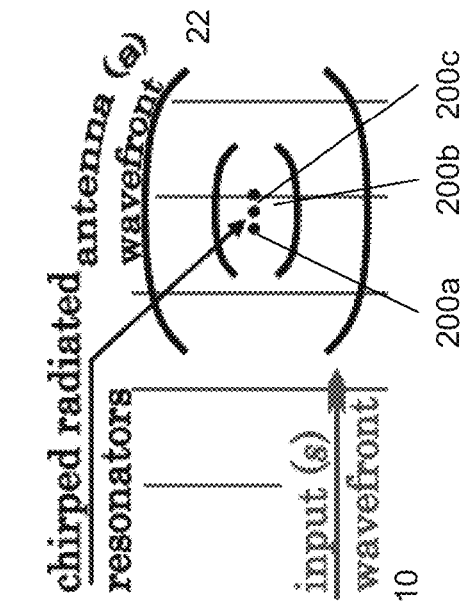
FIG. 2 shows a set of chirped resonators design for right-angle wave coupling driven with the same source as shown in FIG. 1.

Following below are more detailed descriptions of various concepts related to, and embodiments of, inventive systems, methods and apparatus for vertical coupling radiation from a dielectric waveguide. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A frequency-chirped nanophotonic dipole antenna electromagnetically coupled to the dielectric waveguide achieves broadband, efficient sub-wavelength vertical emission from a dielectric waveguide. Embodiments of this vertical coupling structure may be less than half a wavelength long (e.g., less than 775 nm at an operating wavelength in the telecom C band). In one embodiment, this unique and effective coupling structure includes a plasmonic antenna placed above a $Si_3N_4$ or Si waveguide. Embodiments of this coupling structure may also include a ground plane disposed below the waveguide to enhance emission efficiency. Three-dimensional Finite-Difference Time-Domain (FDTD) simulations reveal that this structure can operate with up to 55% vertical emission efficiency and a bandwidth of 500 nm.

Because this coupling structure is so short, it is suitable for vertical coupling in Silicon On Insulator (SOI) based Optical Phased Arrays (OPAs). In an OPA, the desired emitter characteristics include strong waveguide-to-free-space output coupling in a compact structure—e.g., less than one wavelength long. The short emitter length (e.g., $<\lambda/(2n_{eff})$, where $n_{eff}$ is the effective index of the waveguide) of the inventive coupling structures makes it possible to fit many emitters in a small area and to achieve wide divergence angles within a single lobe of the emitted beam.

Short vertical couplers are also suitable for coupling light from waveguides to optical fibers. As noted above, conventional vertical couplers (gratings and prisms) are typically designed such that their emission patterns match the fiber modal diameters, so they end being about 10-30 μm long or longer. Reducing the coupler size typically increases the emitted beam's divergence angle (and, advantageously, its bandwidth), which reduces the efficiency with which the emitted beam is coupled into the optical fiber. In fact, even long vertical couplers tend to operate with some loss because they emit beams that are not perfectly matched to the fiber mode, e.g., due to imperfections in the coupler, the fiber, or the fiber/coupler alignment.

Fortunately, the loss caused by modal mismatch can be mitigated with a diffractive optical element, such as a modified zone plate, placed between the vertical coupler and the optical fiber. This diffractive optical element collimates the beam emitted by the vertical coupler, enabling the use of a compact (e.g., less than 10 μm wide and less than 10 μm long) vertical coupler that emits broadband light (e.g., light with a bandwidth of about 300 nm or more). The diffractive optical element's design can be optimized, e.g., using semivectorial simulations with a simple stochastic optimization, to provide a better match between the fiber mode and the beam mode. In one example, three-dimensional FDTD simulations reveal about 50% fiber coupling efficiency and a bandwidth of about 200 nm.

Radiative Vertical Coupling Structures

One embodiment of the present disclosure includes a vertical coupling structure, or antenna, with deep sub-wavelength frequency chirped elements that resonate constructively to provide sub-wavelength emission from a nanophotonic dielectric waveguide. FDTD simulations of a one-layer antenna plus a ground plane show 55% up emission with a structure only one third of a free-space wavelength long. In this embodiment, the antenna comprises a cluster of metallic nano-rods that resonate when illuminated with light in the telecom C-band (1530-1565 nm). As understood by those of skill in the art, the antenna can be scaled to operate at any band of the electromagnetic spectrum, including the visible band (about 400 nm to about 1600 nm), the mid-infrared band (about 3 μm to about 14 μm), and the THz-microwave band (about 50 μm to about 50 cm), to achieve efficient, sub-wavelength coupling between two propagating modes.

Treating the nanoantenna as a resonator and using coupled-mode theory in the time domain provides intuition about the coupling between the nanoantenna and the waveguide. Coupled-mode theory assumes that the modes are shape invariant and drops the second order terms, enabling quantitatively accurate results only with weakly coupled modes; however, it provides useful qualitative insight even when modes are strongly coupled.

Figure 1:
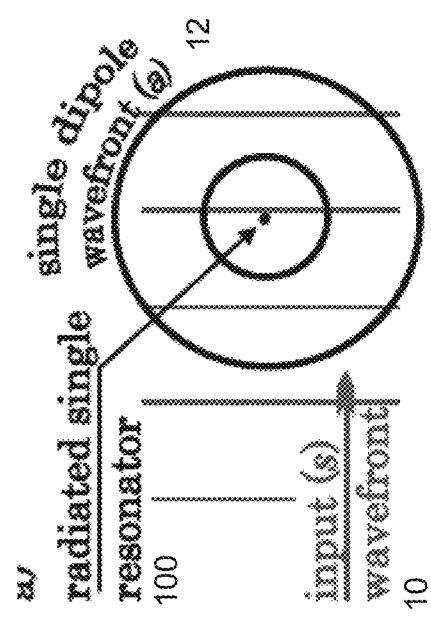
FIG. 1 shows a side view of a single resonator (here a dipole) driven by a plane wavefront.

FIG. 1 illustrates a single dipole resonator 100 that is excited with an incident electromagnetic field 10. As understood by those of skill in the art, the resonator's structure, size, and composition can be selected to provide a desired resonance frequency (or frequencies). At optical frequencies, for example, the resonator 100 may include a rod or particle with a size on the order of nanometers or microns. An optical-scale radiating resonator (or set of radiating resonators) may be known as a "nanophotonic antenna."

When driven at its resonant frequency, this dipole resonator 100 emits radiation 12 isotropically (i.e., in all directions). If the resonator 100 reacts with an energy amplitude a and a coupling coefficient μ to a perturbing mechanism (e.g. an electromagnetic field guided by a waveguide), the resonator's reaction to the perturbing mechanism can be described by the following first-order differential equation:

$$\frac{da}{dt} = (j\omega_0 - 1/\tau)a - j\mu s \quad (1)$$

where $\omega_0$ is the resonator's resonance frequency and τ is the resonator's field decay rate. In a nanophotonic antenna, the loss mechanisms can be broken down into radiation, ohmic, and coupling losses, with decay rates $\tau_r$, $\tau_o$, and $\tau_c$, respectively. The steady-state solution to Eq. (1) with an input at a frequency ω is:

$$a = \frac{-j\mu s}{j(\omega - \omega_0) + 1/\tau} \equiv R\mathrm{sexp}(j\Delta\varphi), \quad (2)$$

where the resonator response has an absolute value of R and phase Δϕ. One can change the phase response of the resonator, Δϕ, through a maximum total range of π radians by changing the resonator's resonance frequency, $\omega_0$. For example, the resonator's resonance frequency can be varied by designing the dipole to have a different length. When μ is positive, Δϕ will vary in the range (-π, 0) depending on the value of $\omega_0$. If the resonator mode is leaky, the phase of the emitted field will be the same as that of the resonator.

Using this principle, and the space dependence of an input wave, exp(-jkz), makes it possible to place several resonators with different resonances along the waveguide in such a way that the resonators resonate with the same phase. In some examples, the spacing, $\Delta_z$, between resonators is small enough (e.g., λ/100 to λ/10), or tens of nanometers for optical waves) so that several resonators fit with a region along the waveguide with a length of about $\lambda/(2n_{eff})$ or less. To achieve vertical emission, the difference between the phase response of adjacent resonators may be chosen to compensate for the difference, exp(-jkΔ_z), between their input phases due to their separation. Thus, the phase response of each resonator in the emitter may be closely related to its location with respect to the other resonators in the emitter.

FIG. 2 shows a set of frequency chirped dipoles 200a, 200b, and 200c (collectively, dipoles 200) excited by an incident electromagnetic field 10. Each of these dipoles 200 resonates in response to the field 10; this resonance causes the dipoles to emit radiation isotropically. Because the dipoles 200 are frequency chirped, the emitted fields interfere constructively in one direction (e.g., the vertical direction) and destructively in other directions (e.g., the horizontal direction) to form a wavefront 22 that is flatter than an isotropic wavefront. In other words, these dipoles 200 provide antenna gain: they increase power radiated in one direction at the expense of power radiated in another direction. Neglecting ohmic losses in the antenna, the resonators' relative phases determine the direction of the radiated wavefront 22; these phases can be changed, e.g., by mechanically adjusting the dipoles' length(s) or by heating the dipoles so as to change their phase relationship(s) and resonance frequencies.

The interference produced by the radiating dipoles 200 can be described analytically as follows. Considering cross-talk between the different components of the antenna 200, one can rewrite Eq. (1) for the resonators 200 as follows:

$$\frac{da_i}{dt} = (j\omega_i - 1/\tau_i)a_i - j\sum_k \mu_{ik} a_k \quad (3)$$

where $\omega_i$ and $\tau_i$ are the ith resonator's natural resonance frequency and decay rate, respectively, and $\mu_{ik}$ is the coupling coefficient from the kth to the ith resonator (e.g., either dipole 200a, 200b, or 200c). When all the resonators cycle with the same phase (i.e., $a_i$ and $a_k$ have the same phase), then the ratio $a_k/a_i$ is a positive real number. If the coupling coefficient $\mu_{ik}$ is also positive and real, then Eq. (3) shows that the summed coupling coefficients $\mu_{ik}$ are subtracted from the resonator's natural resonance frequency, $\omega_i$. This reduction in the resonator's natural resonance frequency is equivalent to a red shift and occurs without causing any fluctuations in the amplitude over time.

FIGS. 3A and 3B show side and top views, respectively, of a vertical coupling structure 320 that couples radiation out of a dielectric waveguide 310, such as a silicon waveguide on silicon dioxide. The vertical coupling structure 320 includes a set of low-frequency dipole rod resonators 322a, 322b, and 322c (collectively, low-frequency resonators 322); a set of middle-frequency dipole rod resonators 324a-324d (collectively, middle-frequency resonators 324); and a set of high-frequency dipole rod resonators 326a-326e (collectively, high-frequency resonators 326). These dipoles 322, 324, 326 are arranged in a half-wavelength section ($\pi$ phase region) to act as a sub-wavelength vertical coupler through constructive interference.

The resonators 322, 324, and 326 are chosen to have different phase responses and are placed along the waveguide axis such that the sum of the input wave phase $k_z$ and the specific phase response is the same for each resonator 322, 324, 326. This results in constructive interference in the designed output direction. In this case, the resonators' outputs interfere constructively to produce a wavefront 32 that propagates in the vertical direction—at an angle of roughly 80-100° (e.g., 85°, 90°, or 95°) with respect to the waveguide 310.

The rod resonators 322, 324, and 326 may be formed of metal or other conductive material in electromagnetic communication with the waveguide. For example, the resonators 322, 324, and 326 may be formed of silver, gold, platinum, aluminum, or any other suitable conductor. They may all be formed of the same conductive material, or they may be formed of different conductive materials. Similarly, the waveguide 10 can be formed of any suitable material, including, but not limited to silicon, silicon dioxide, silicon nitride, silicon oxinitride, metal, and Teflon. The resonators 322, 324, and 326 may be disposed directly on the waveguide 310 or on a dielectric layer formed over the waveguide 310. The resonators may also be openings (slits) in a metallic waveguide that operates at longer wavelengths (e.g., at millimeter-wave or Terahertz frequencies).

For instance, the vertical coupling structure 320 may be disposed in a plane above the waveguide 10, which can be made of $Si_3N_4$. In this example, the waveguide 310 has a width of 700 nm and a height of 220 nm. An additional metallic ground-plane 330, which may be an 80 nm Al ground-plane, is placed under the waveguide 10 to facilitate vertical coupling. The dipole resonators 322, 324, and 326 in the vertical coupling structure 320 are formed of a 60 nm Al antenna layer, with a ground plane to antenna separation of 680 nm and a waveguide to antenna separation of 100 nm. The permittivities of $Si_3N_4$ and $SiO_2$ are 4 and 2.1, respectively, at 1550 nm. The Drude parameters used for Aluminum are $\gamma_d$=2.4×10$^{14}$ rad/s and $\omega_p$=2.2×10$^{16}$ rad/s.

As shown in FIG. 3A, the resonators 322, 324, and 326 are arrayed along the waveguide such that they span a distance d in the z direction that is shorter than the wavelength 2 of the electromagnetic wave 30 guided by the waveguide 310. In some embodiments, the distance d may be less than or equal to $\lambda/(2n_{eff})$, where $n_{eff}$ is the waveguide's effective index of refraction. For a wavelength of $\lambda$=1550 nm and an effective refractive index $n_{eff}$=3.1, the distance d≤250 nm. At shorter (longer) wavelengths and higher (lower) effective refractive indices, the resonators 322, 324, and 326 span a shorter (longer) distance.

As shown in FIG. 3B, the resonators' long axes are oriented in the x direction—normal to the plane that contains both the direction 30 in which radiation propagates through the waveguide 310 and the emitted wavefront's direction of propagation. In addition, the resonators 322, 324, and 326 are repeated laterally (e.g., in the x direction) to further enhance the coupling efficiency at each longitudinal position. The low-frequency dipole rod resonators 322 are relatively short—each spans only a fraction of the waveguide's width—and are distributed symmetrically about the x axis. To account for the red shift caused by the proximity of different resonators 322, 324, and 326 with the same phase, the rod lengths are shortened to slightly blue shift the resonance back to the desired values. The outer resonators 322a and 322c overlap the waveguide's left and right edges, respectively, and the central resonator 332b overlaps the central portion of the waveguide 310. The middle-frequency dipole rod resonators 324 are shorter than the low-frequency rod resonators 322 and are arranged in a similar fashion. And the high-frequency dipole rod resonators 326 are shorter than the middle-frequency resonators 324 and are also distributed symmetrically about the x axis.

Figure 4B:
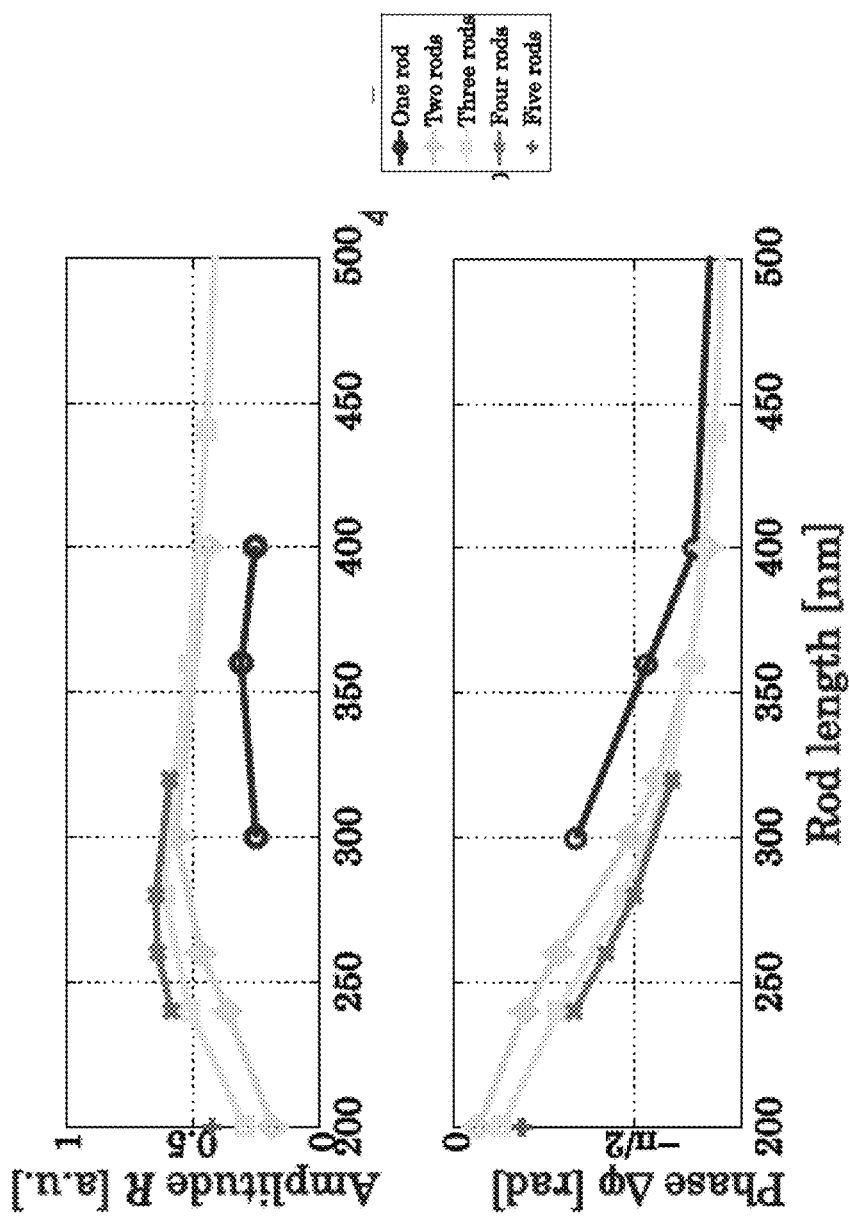
FIG. 4B includes plots of the amplitude R (top) and phase $\Delta\phi$ (bottom) of the wave emitted by the coupling structure shown in FIG. 4A versus nano-rod length for different numbers of nano-rods and an excitation wavelength of 1550 nm.
Figure 4A:
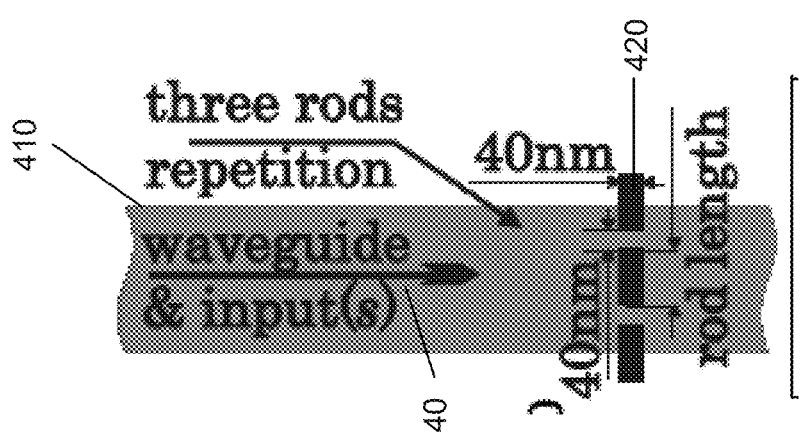
FIG. 4A shows a vertical coupling structure that includes a set of nano-rods electromagnetically coupled to a dielectric waveguide.

FIGS. 4A and 4B illustrate the effect of rod length and rod number on vertical coupling efficiency and phase response. FIG. 4A shows a dielectric waveguide 410 that guides an electromagnetic wave 40 towards an antenna, shown as a set of dipoles 420, configured to couple at least a portion of the wave 40 out of the waveguide 410. FIG. 4B shows the antenna's simulated amplitude response (upper plot) and phase response (lower plot) as a function of dipole length for one dipole (circles), two dipoles (diamonds), three dipoles (squares), four dipoles (x's), and five dipoles (crosses). These responses were calculated via three-dimensional FDTD simulations using a waveguide with no ground plane as the feeding mechanism.

The one-rod curve (circles) in FIG. 4B shows the resulting amplitude and phase responses at a wavelength of 1550 nm as a function of rod length. Using Eq. (2) and the asymptotic value of the phase response for the lowest resonance (about −2.5 rad) yields a decay rate $\tau$ of about 1 fs. With such a short decay intrinsic to a nano-rod, each nano-rod is undercoupled. Thus, lateral repetition of the nano-rods enhances overall coupling. The data plotted in FIG. 4B confirm that the maximum amplitude response corresponds to a phase response of $\lambda/2$, as expected from Eq. (2).

FIG. 5A shows a red-shift corrected vertical coupling structure 520 that includes multiple sets of frequency-chirped nano-rods: a first set 521 of 3×630 nm nano-rods, a second set 522 of 3×320 nm nano-rods, a third set 523 of 4×240 nm nano-rods, a fourth set 524 of 4×200 nm nano-rods, a fifth set 525 of 5×160 nm nano-rods, and an extra (sixth) set 526 of 2×160 nm nano-rods as arranged along the z axis. (A×B nm stands for (repetition number)×(rod length) and the order of writing is the order along the z axis.) This vertical coupling structure 520 is called a "red-shift corrected" structure because the nano-rod lengths are shortened slightly to account for the red shift described above with respect to Eq. (3).

The distance along the z axis from the first set 521 of nano-rods to the sixth set 526 of nano-rods is less than half the wavelength. This coupling structure 520 is disposed on the opposite side of a planar dielectric waveguide 510 from a conductive ground plane (not shown). The waveguide 510 guides an electromagnetic wave 50 towards the vertical coupling structure 520. The rod resonators in the coupling structure 520 respond to this perturbation by radiating constructively in the vertical direction. As shown in FIG. 5C, the main lobe radiated from the full structure 520 has a FWHM of less than 30°.

FIG. 5C is a plot of the vertical transmission versus wavelength for the red-shift corrected phase-chirped antennas 520 shown in FIG. 5A (dash-dotted line), an uncorrected phase-chirped antenna (dashed line), and a 4×280 nm nano-rod antenna excited on resonance (solid line). The nano-rods in the uncorrected structure are arranged along the z axis in a first set of 3×680 nm rods, a second set of 3×360 nm rods, a third set 523 of 4×280 nm rods, a fourth set of 4×240 nm rods, and a fifth set of 5×200 nm. The solid lines show that the ohmic losses are under 10%. Each structure represented by FIG. 5C also includes a ground plane at a distance D of about $3\lambda/(4n_{cladding})$ under the nano-rods for constructive vertical coupling, where $n_{cladding}$ is the refractive index of the waveguide cladding. These ground planes combine the bottom and top emissions so as to increase the vertical coupling.

The results shown in FIG. 5C were obtained by monitoring the spectral content of the fields over the surface of a box enclosing each structure (e.g., box 52 in FIG. 5A). More specifically, the data plotted in FIG. 5C were derived by calculating the amount of energy leaving each facet of each box using FDTD simulations. Other losses, including emission out through the sides, bottom, and rear of the box, had significantly lower values (<10% each at 1550 nm). These three-dimensional FDTD simulations show that metallic nanoantenna structures can vertically emit at least 55% of an input wave over a 3 dB bandwidth of 500 nm in a structure only one third of a free-space wavelength long. Furthermore, the inventive structure can be made with commonly available materials. Repeating the structure longitudinally enables even more efficient emission.

Arrays of Vertical Coupling Structures

FIG. 6 shows a dielectric waveguide 610 that is electromagnetically coupled to an array 600 of vertical coupling structures 620a, 620b, 620c, and 620d (collectively, coupling structures 620), e.g., as described above with respect to FIGS. 3A, 3B, and 5A. In this example, the vertical coupling structures 620 are arranged along the z direction at periodic intervals of $L \geq \lambda/n_{eff}$. (The vertical coupling structures may also be arranged aperiodically.) Light 60 propagating through the waveguide in the z direction excites each vertical coupling structure 620, causing each vertical coupling structure to emit a beam of light in the vertical direction (out of the page).

If desired, each coupling structure 620 can couple a fixed portion (e.g., 5%) of the incident radiation out of the waveguide 610 so as to generate an array of beams with amplitudes that decrease as a function of coupling structure position. Alternatively, the coupling structures 620 may be designed to emit progressively increasing percentages of radiation, e.g., to produce an array of beams with matching amplitudes.

In addition, the coupling structures 620 may be designed to resonate at different frequencies. For example, the first coupling structure 620a may resonate at a first wavelength (e.g., 1550 nm), the second coupling structure 620b may resonate at a second wavelength (e.g., 1550.8 nm), and so on. These wavelengths may be chosen to correspond to wavelength-division multiplexing (WDM) or dense WDM (DWDM) channel spacings. The coupling structures 620 may also be used to couple light into the waveguide 610.

Each coupling structure 620 may also be actuated with a respective heater (not shown) or other actuator that changes the phase relationship among the coupling structure's constituent dipole resonators. For instance, a monolithically integrated heating element may heat the dipole resonators in a given coupling structure 620 so as to increase the phase difference(s) among dipole resonators and/or to change the dipole resonators' resonance frequency. This varies the direction of constructive interference, which in turn steers the coupling structure's output in angle. If the phase shift is large enough, constructive interference may occur in the +z direction, effectively turning off the coupler 620 by causing it to absorb and re-radiate the incident radiation in the propagation direction supported by the waveguide 610. Similarly, changing the resonators' resonance frequency causes the vertical coupling structure 620 to couple light at a different wavelength. This property can be used to tune the coupling structure 620, e.g., for dynamic add/drop multiplexing in a WDM or DWDM device.

Diffractive Collimators for Vertical Couplers

As noted above, conventional vertical fiber-chip couplers are typically several microns (e.g., about 10 μm) long or longer. This is because the coupler length is chosen to emit a beam whose field distribution matches the mode profile of the fiber so as to maximize the coupling efficiency. This dimensional constraint limits the coupler bandwidth to about 60 nm FWHM, which is at the same order as the fabrication errors for the center wavelength. In addition, this mode-matching requirement constrains the vertical coupler's minimum size.

The vertical couplers disclosed herein, including the nano-antennas described above, may be shorter and may operate with much larger bandwidths (e.g., 150 nm, 200 nm, 250 nm, 300 nm, or more). Although these vertical couplers operate with much greater bandwidths than conventional vertical couplers, they also emit beams whose field profiles do not necessarily match the fiber mode profiles (e.g., the $TEM_{00}$ field profile supported by a single-mode optical fiber).

The diffractive optical elements disclosed herein are configured to collimate the beams emitted by short, broadband vertical coupling structures (emitter). In certain embodiments, these diffractive optical elements are designed to transform the mode profiles of the beams emitted by the vertical coupling structures to mode profiles that more closely match the mode profiles of optical fibers so as to increase waveguide-to-fiber coupling efficiency. For instance, allowing the field emitted by a short coupling structure to expand through propagation, and then correcting its phase using an integrated zone plate, makes it possible to match the emitted field distribution to that of a fiber mode.

FIG. 7A shows a chip-to-fiber coupling structure 701 with a diffractive optical element 730 that collimates light 70 emitted by a short vertical coupler 720 from a waveguide 710. As explained below with respect to FIGS. 9A-9C, the diffractive optical element 730 resembles an irregular Fresnel lens or phase-only zone plate. The diffractive optical element 730 emits a collimated beam 73 whose mode profile substantially matches the mode profile of an optical fiber 760 position above the vertical coupler 720. In some embodiments, this mode profile may be a $TEM_{00}$ mode support by a cleaved single-mode fiber.

As shown in FIG. 7A, the wave 70 emitted by the vertical coupler diverges over an angle 71 as it propagates through a semiconductor layer 751, such as silicon dioxide cladding, deposited over the waveguide 710 and the vertical coupler 720. The optical thickness of this semiconductor layer 751 may be chosen such that the diverging wave's amplitude profile is approximately or substantially equal to the amplitude profile of the desired fiber mode at the plane of the diffractive optical element 730. The diffractive optical element 730 diffracts the diverging wave 70 so as to form a collimated wave 73 whose wave front (phase and amplitude profile) matches the wave front of the desired fiber mode.

FIG. 7B illustrates a modified version 702 of the chip-to-fiber coupling structure shown in FIG. 7A. As in FIG. 7A, the vertical coupler 720 couples light out of the waveguide 710. In this version, the emitted beam 70 propagates through a negative lens element 740, which may be a Fresnel lens, zone plate, or other diffractive or refractive optical element, disposed above the vertical coupler 720. This negative lens element 740 causes the emitted beam 70 to diverge more quickly than it would otherwise so as to form a diverging wave 74. In other words, this diverging beam 74 has a divergence angle 75 that is larger than the divergence angle 71 (FIG. 7A) of the emitted beam 70. As a result, this negative lens element 740 provides the amplitude profile modification provided by propagation through the cladding layer 751 in FIG. 7A, but over a shorter distance.

A semiconductor cladding layer 752 separates the diffractive optical element 730 from the vertical coupler 720 and the negative lens element 740. Because the diverging beam 74 diverges so quickly, the diffractive optical element 730 is closer to the vertical coupler 720 in this chip-to-fiber coupling structure 702 than in the first chip-to-fiber coupling structure 701 (FIG. 7A). This, in turn, allows the use of a thinner oxide layer and eliminate the need for additional oxide growth. If desired, this negative lens element 740 can be designed as a positive lens element to provide a larger distance to the collimating lens, e.g., to meet different fabrication constrains. As described above, the diffractive optical element 730 collimates the diverging wave 74 to form a collimated 73 whose phase profile matches that of the desired fiber mode.

The diffractive optical element 730 may also correct or compensate for aberrations in the emitted beam 70 or the diverging beam 74. As understood by those of skill in the art, the emitted beam 70 may be aberrated due to imperfections in the vertical coupler 720. For instance, the vertical coupler 720 may be misaligned with respect to the waveguide 710 or fabricated imperfectly, resulting in undesired spherical aberration, astigmatism, coma, or distortion. Similarly, misalignment and manufacturing imperfections in the negative lens element 740 may introduce aberrations into the diverging beam 74. Left uncorrected, these aberrations may reduce the coupling efficiency to the fiber 760 by affecting how well the diffractive optical element 730 collimates the beam 70 emitted by the vertical coupler 720. In addition, aberration correction/compensation reduces the emitter length necessary to achieve a desired emission efficiency without constraints on the amplitude or phase profile.

FIGS. 8A-8D are plots that illustrate the action of the collimating lenses (diffractive optical elements 730) shown in FIGS. 7A and 7B. FIG. 8A shows the mode profile of a beam emitted by an exemplary vertical coupler, such as a short (e.g., <5 μm long) grating or a nanophotonic antenna. It is not uniform and does not match the symmetric optical fiber mode, shown in FIG. 8B. FIGS. 8C and 8D show the phase profiles of the beam emitted by the same exemplary vertical coupler before and after collimation. FIG. 8C again shows the emitted beam's irregularity, whereas FIG. 8D shows that the collimated beam is more nearly circularly symmetric. This increase in circular symmetry improves the coupling efficiency.

Figure 9A:
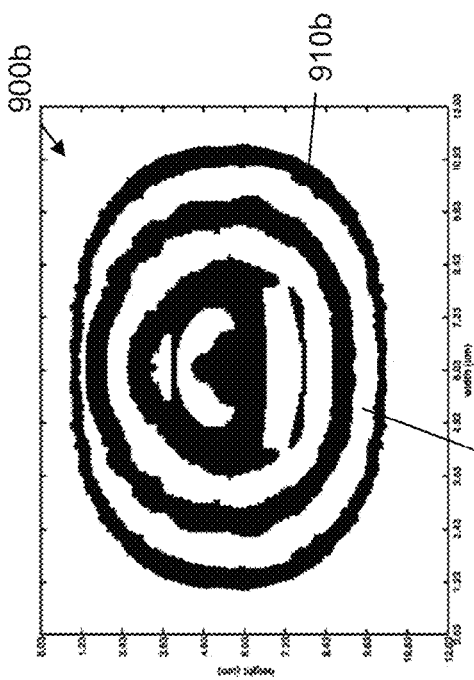
FIGS. 9A-9C are plan views of diffractive optical elements suitable for collimating light emitted from a vertical coupler into an optical fiber.
Figure 9B:
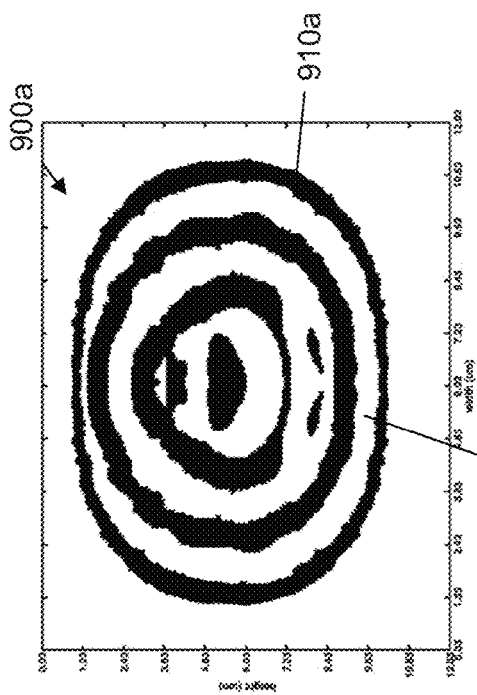
Figure 9C:
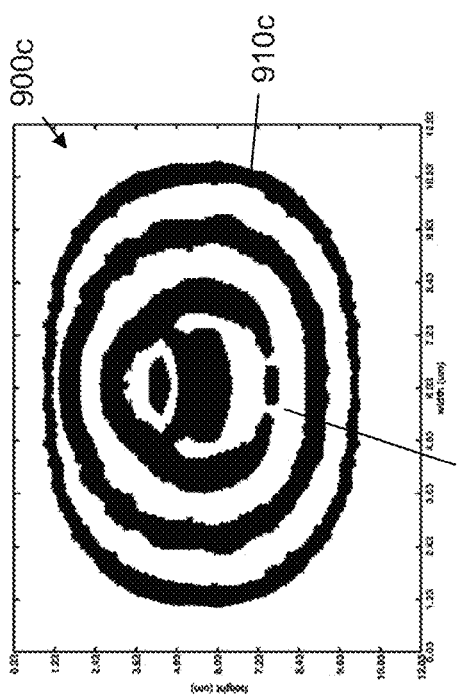

FIGS. 9A, 9B, and 9C are plan views of diffractive optical elements 900a, 900b, and 900c, respectively (collectively, diffractive optical elements 900), that compensate for aberrations in addition to collimating a diverging beam. These diffractive optical elements 900 are each about 9 μm wide by about 9 μm wide. Each element 900 comprises several respective high-index regions 910a, 910b, and 910c (collectively, high-index regions 910) and several respective low-index regions 920a, 920b, and 920c (collectively, high-index regions 920). (In other embodiments, the high-index regions 910 may be replaced by absorbing or reflecting regions.) Suitable materials for fabricating these regions include, but are not limited to polycrystalline silicon, $Si_3N_4$, and SiON.

Some of these regions 910 and 920 take the shape of an irregular annulus or ring with a width of about 1 μm and an outer diameter ranging from about 2 μm to about 9 μm, whereas others are irregular closed loops. In other words, each of these regions 910, 920 has a non-uniform shape. Some of the regions 910 and 920 depicted in FIGS. 8A-8C have left-right vertical symmetry. All of the regions 910 and 920 depicted in FIGS. 8A-8C lack circular symmetry.

In certain respects, the diffractive optical elements 900 resemble Fresnel lenses or binary zone plates. Like Fresnel lenses and zone plates, they include (roughly) concentric regions 910, 920 of varying refractive index. Unlike Fresnel lenses and zone plates, these regions 910, 920 are irregularly shaped when viewed along the device's optical axis. When viewed from a direction orthogonal to the optical axis, these regions 910, 920 appear step-like, much like the transmittance function of a binary zone plates, as opposed to the curved regions in the index profile of a Fresnel lens.

The diffractive optical elements 900 shown in FIGS. 9A-9C can be designed using stochastic optimization or any other suitable recursive or iterative process to increase or maximize the coupling efficiency to the optical fiber. Other suitable design processes include, but are not limited to simulated annealing and genetic optimization. These iterative or recursive design processes can also be used to determine the optical distances between the vertical coupler and the (optional) negative lens element, the diffractive optical element, and the optical fiber.

Figure 10A:
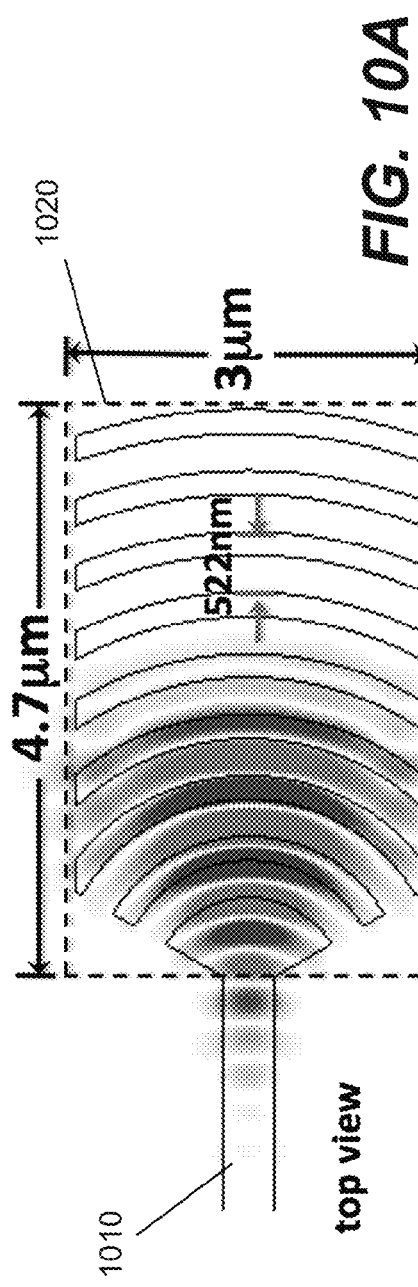
FIG. 10A illustrates a short grating that couples broadband light out of a dielectric waveguide.

For instance, each diffractive optical element can be designed by running stochastic optimization as a semivectorial simulation using the Fresnel diffraction integral with the original Green's function and no paraxial approximation. Running this for a large number of iterations, then testing the resulting element's performance using an FDTD simulation to prove its efficiency yields a shape suitable for fabrication as a diffractive optical element. To see how, consider a vertical emitter, such as a grating 1020, with a size of 3 μm×4.7 μm and a grating period of 522 nm as shown in FIG. 10A. This grating 1020 couples broadband light out of a dielectric waveguide 1010. Running a three-dimensional FDTD simulation of the waveguide 1010 and emitter 1020 alone looking yields the amplitude distribution of the light emitted by the emitter at different heights above the waveguide and emitter. This amplitude distribution can be used to determine the height that gives the amplitude distribution best-fit to the fiber mode field distribution (in this case, the height is 6.1 μm). This height is used for the phase-correcting lens (e.g., diffractive optical element 730 in FIGS. 7A and 7B).

Figure 10C:
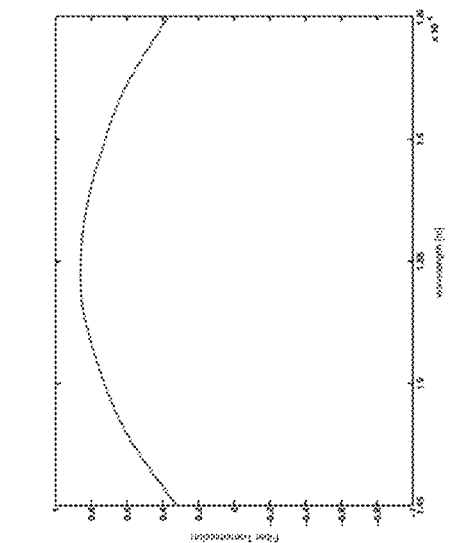
FIG. 10C is a plot of the normalized power spectrum transmitted from vertical coupler through an optical fiber via a vertical coupler and a diffractive optical element.
Figure 10B:
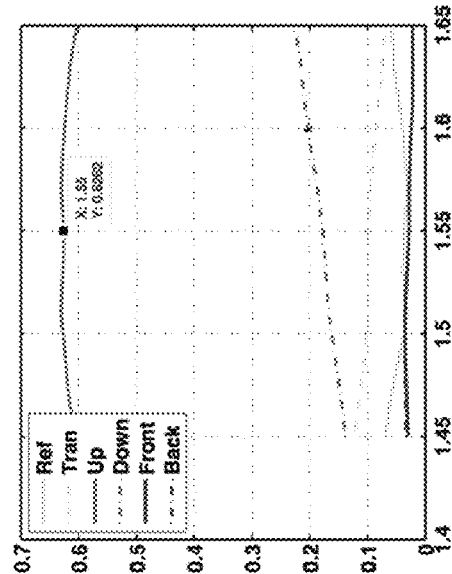
FIG. 10B is a plot of energy transmitted by the short grating through the surfaces of the bounding box (dashed line) in FIG. 10A.

FIG. 10B is a plot of the normalized energy versus wavelength emitted through the surfaces of the bounding box (dashed line) surrounding the short grating 1020 in FIG. 10A. The grating's transmission is over 60% in the vertical (up) direction over a wavelength range of about 1.45 μm to about 1.65 μm. Downward (down) transmission increases with wavelength from about 15% to about 22% over this wavelength range. Transmission through the other surfaces is about 10% or lower over the entire wavelength range.

FIG. 10C is a plot of the coupling efficiency as a function of wavelength for the phase-correcting lens (diffractive optical element) designed according to the process described above. This phase-correcting lens collimates the light in order to make it similar to the fiber mode. The plot shows that a maximum coupling efficiency of 86.3% at wavelength of 1550 nm with a fiber tip height of 6.1 μm above the waveguide and vertical coupler.

Stochastic optimization and/or other processes can also be applied when designing the lower lens (e.g., negative lens element 740 in FIG. 7B) to achieve an amplitude shape that corresponds to the amplitude profile of the fiber mode. For example, a diverging lens (negative lens element) can be created using a series of 10 nm features spread randomly across a predetermined trial area. (The 10 nm feature size is selected to conform to fabrication specifications.) The lens's performance is calculated, then the features are changed (e.g., one or more of the existing features is moved or removed, one or more new features is added), and the lens's performance is calculated again. If the change(s) contribute to higher mode coupling, then the change(s) is (are) accepted, and pixels surrounding the changed pixel(s) are tested in a subsequent iteration. Changes that do not increase the mode coupling may be discarded.

The negative lens can also be positioned at a target height on top of cladding above the waveguide and first lens. To determine this target height, assume a collimated beam at the output of the waveguide vertical coupler with a diameter d corresponding to the vertical coupler length and width. The focal length of the negative lens is $$f_1 \approx -\frac{h}{D/d - 1},$$

where h is the desired distance between the negative lens and the collimating lens and D is the fiber mode diameter. The collimating lens's focal length is then $f_2 = h + f_1$. If the vertical coupler's length and width are different, astigmatism can be added to either or both lenses by calculating $f_{1,2\leftrightarrow}$ and $f_{1,2\updownarrow}$ using the two dimensions $d_\leftrightarrow$ and $d_\updownarrow$ separately. Adding astigmatism to the negative lens or the collimating lens yields elliptical line curves on the lens when the lens is viewed from along its optical axis. A near-field approximation for the waveguide coupler to first lens and for the second lens to fiber tip is assumed here. If desired, $f_1$ and $f_2$ can be refined for better overlap to the fiber mode. To further increase fiber coupling efficiency, an arbitrary shape may be drawn on the negative lens plane and optimized using stochastic changes in the negative lens as described above. This optimization can be accelerated by using semivectorial simulation for speed enhancement. The resultant lens mask(s) is (are) smoothed using a low-pass filter to remove or apodize small points and sharp corners. The smoothed mask(s) can be tested with a full vectorial FDTD simulation for verification.

Figure 11:
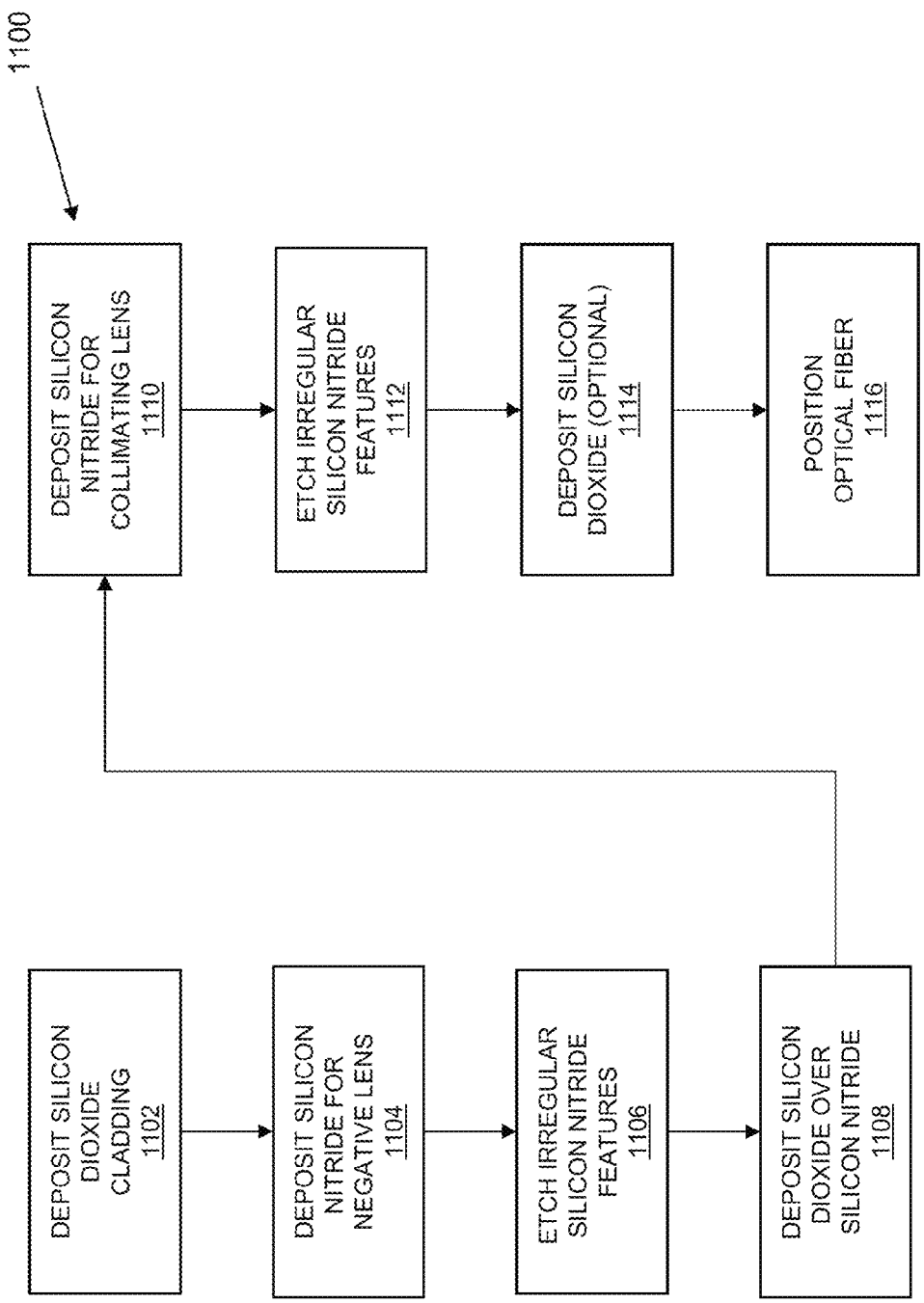
FIG. 11 is a flow chart that illustrates a process for fabricating a diffractive optical element suitable for collimating light emitted from a vertical coupler into an optical fiber.

FIG. 11 illustrates a process 1100 for making a chip-to-fiber coupling structure like the one shown in FIG. 7B. The process 1100 begins with deposition (1102) of a cladding layer, such a silicon dioxide layer, on the dielectric waveguide and/or the vertical coupler. This cladding layer may have a thickness of about 50 nm to about λ/2n, where n is the index of the cladding layer. Next, a high-index material, such as silicon nitride, is deposited (1104) on the cladding layer. This high-index material may be about 200 nm thick and is etched (1106) to form irregular high-index regions in the negative lens. Depositing low-index material (1108), such as silicon dioxide, on the etched high-index material yields a negative lens element. The low-index material also forms a second cladding layer, which may be several microns thick (e.g., 3 μm, 4 μm, 5 μm, or 6 μm), through which the diverging wave propagates (expands) to match the amplitude profile of the desired fiber mode. A second layer of high-index material (e.g., a 200 nm thick layer of silicon nitride) is deposited (1110) and etched (1112) into irregular high-index regions for the collimating lens. If desired, low-index material can be deposited (1114) into the voids formed by etching the second layer of high-index material; otherwise, the voids can be filled with vacuum, air, or any suitable fluid. The optical fiber is then positioned over the collimating lens so as to maximize coupling efficiency.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus comprising:
a waveguide to guide a first optical wave having a wavelength $\lambda$ in a first direction;
a vertical coupler, in optical communication with the waveguide and having a length in the first direction of about 10 nm to about 10 µm, to couple at least a portion of the first optical wave out of the waveguide so as to produce a second optical wave propagating in a second direction at an angle of about 80° to about 100° with respect to the first direction;
a diffractive optical element, in optical communication with the vertical coupler and comprising at least one irregularly shaped region of first dielectric material, to collimate at least a portion of the second optical wave so as to produce a collimated wave.

2. The apparatus of claim 1, wherein the vertical coupler comprises at least one of a dielectric grating and a nano-antenna.

3. The apparatus of claim 1, wherein the vertical coupler has a bandwidth of about 60 nm to about 500 nm.

4. The apparatus of claim 1, wherein the apparatus further comprises:
a layer of a second dielectric material disposed between the vertical coupler and the diffractive optical element.

5. The apparatus of claim 4, wherein the at least one irregularly shaped region of first dielectric material comprises a plurality of irregular rings, and
wherein the diffractive optical element further comprises second dielectric material deposited between at least two irregular rings in the plurality of irregular rings.

6. The apparatus of claim 4, wherein the first dielectric material comprises at least one of silicon nitride, silicon oxinitride, and silicon dioxide and the second dielectric material comprises silicon dioxide.

7. The apparatus of claim 1, further comprising:
an optical fiber to receive at least a portion of the collimated wave.

8. The apparatus of claim 1, wherein the diffractive optical element is a first diffractive optical element, and further comprising:
a second diffractive optical element, disposed between the vertical coupler and the first diffractive optical element, to cause the second optical wave to diverge.

9. The apparatus of claim 8, wherein:
the waveguide comprises a cladding having a refractive index $n_{cladding}$; and
the second diffractive optical element is disposed about 50 nm to about $\lambda/n_{cladding}$ from the vertical coupler.

10. The apparatus of claim 8, further comprising:
an optical fiber to receive at least a portion of the collimated wave, and wherein:
the first diffractive optical element is configured to cause a wavefront of the collimated wave to substantially match a phase distribution associated with a mode of the optical fiber, and
the second diffractive optical element is configured to cause a spatial amplitude distribution of the collimated wave to substantially match an amplitude distribution associated with the mode of the optical fiber.

11. The apparatus of claim 1, wherein the waveguide has an effective refractive index of $n_{eff}$ and the vertical coupler comprises:
a first coupling structure, electromagnetically coupled to the waveguide, comprising:
a first radiative resonator to couple a first portion of the electromagnetic wave out of the waveguide; and
a second radiative resonator, disposed in the first direction within $\lambda/(2n_{eff})$ of the first radiative resonator, to couple a second portion of the electromagnetic wave out of the waveguide so as to produce constructive interference between the first portion of the electromagnetic wave and the second portion of the electromagnetic wave.

12. The apparatus of claim 11, wherein the waveguide comprises at least one of silicon, silicon dioxide, silicon nitride, silicon oxinitride, metal, and Teflon.

13. The apparatus of claim 11, wherein $\lambda$ is from about 400 nm to about 1600 nm.

14. The apparatus of claim 11, wherein:
the first radiative resonator resonates at a first frequency; and
the second radiative resonator resonates at a second frequency higher than the first frequency.

15. The apparatus of claim 14, wherein the first radiative resonator and the second radiative resonator are configured to produce the constructive interference in the second direction when excited by the electromagnetic wave.

16. The apparatus of claim 14, wherein at least one of the first radiative resonator and the second radiative resonator comprises a dipole antenna.

17. The apparatus of claim 11, wherein at least one of the first radiative resonator and the second radiative resonator comprises a conductive material.

18. The apparatus of claim 11, further comprising:
at least one second coupling structure, in electromagnetic communication with the waveguide and disposed in the first direction at a distance of at least about $\lambda/n_{eff}$ from the first coupling structure, to couple another portion of the electromagnetic wave out of the waveguide.

19. The apparatus of claim 18, wherein the at least one second coupling structure comprises a plurality of coupling structures disposed at periodic intervals in the first direction.

20. A photonic device comprising:
a waveguide, having an effective refractive index of $n_{eff}$, to guide a first optical beam having a wavelength $\lambda$;
a coupling structure, electromagnetically coupled to the waveguide, to couple at least a portion of the first optical beam out of the waveguide so as to form a second optical beam, the coupling structure comprising:
a first resonator to resonate at a first frequency within a bandwidth of the first optical beam;
a second resonator, disposed within $(\lambda/2n_{eff})$ of the first resonator, to resonate at a second frequency within the bandwidth of the first optical beam so as to produce constructive interference in a direction substantially perpendicular to a longitudinal axis of the waveguide;
a negative lens element, in optical communication with the coupling structure, to cause at least a portion of the second optical beam to diverge so as to form a diverging optical beam;
a collimating lens element, in optical communication with the negative lens element and comprising at least one irregularly shaped region of first dielectric material, to collimate at least a portion of the second optical beam so as to produce a collimated beam;
a first cladding layer disposed between the coupling structure and the negative lens element; and
a second cladding layer disposed between the negative lens element and the collimating lens element.

21. The photonic device of claim 20, wherein the bandwidth of the first optical beam is about 100 nm to about 500 nm.

22. The photonic device of claim 20, wherein the first resonator comprises a first dipole antenna and the second resonator comprises a second dipole antenna.

23. The photonic device of claim 20, further comprising:
an optical fiber to receive at least a portion of the collimated optical beam.

* * * * *